June 1, 1965     KUNIO ITOYA     3,187,152
HEATING CONVEYOR BELT

Filed March 19, 1962     3 Sheets-Sheet 1

United States Patent Office 3,187,152
Patented June 1, 1965

3,187,152
HEATING CONVEYOR BELT
Kunio Itoya, 740 Magome-machi Higashi 3-chome,
Ota-ku, Tokyo, Japan
Filed Mar. 19, 1962, Ser. No. 180,626
1 Claim. (Cl. 219—10.69)

The present invention relates to a heating conveyor belt which is adapted to use as a conveyor belt and simultaneously as a heating means, and particularly to a remarkably efficient heating conveyor belt for binding lamellar wooden sheets under heat or production of baked cakes.

Hitherto, a heating conveyor belt has been introduced which is of the type as referred to above, and which is provided with electromagnetic induction means arranged at appropriate intervals along the longitudinal travel of the conveyor belt that has electroconductive metallic bodies coated, for instance, with rubber. Each of such electromagnetic induction means comprises an induction iron core surrounding the belt and induction coils for inducing electric current necessary to generate electric heat on said metallic electroconductive bodies embedded in said conveyor belt, due to electric power from an electrical source which is wound around the iron core.

It is, therefore, an object of the present invention to improve the complexity and economy of a heating conveyor belt. In order to accomplish such an object, the heating conveyor belt according to this invention comprises an endless conveyor belt made of electroconductive material which passes through a frame type iron core or cores each including a coil and a movable iron piece for leaking magnetic fluxes. Since the heating conveyor belt according to this invention generates heat due to electric current passing through the whole conveyor belt, all parts of the conveyor belt are heated uniformly, with the result of ensuring an ideal heating of other substances to be heated and easily controlling the temperature of heat generation as well as complete conversion of input power into heat substantially without loss, by shifting the position of the movable iron piece, advantageously with high efficiency.

A further advantage of this invention lies in that, by connecting this heating conveyor belt to an electric source, heat generates in a short interval of time with an extremely small heat loss, and then when the temperature of the conveyor belt is low, the electric resistance becomes low. Accordingly, the current and power consumption are high whereby heat generation becomes high; when the temperature rises, the electric resistance will become high, which results in a low power consumption and low heat generation, thus, the temperature can be automatically controlled.

In one embodiment of this invention the heat is generated due to induced current which passes through an endless belt, whereas according to a second embodiment of this invention, in order to attain sufficient heat generation by increasing electric current through said endless belt, an endless heating conveyor belt passes through a frame-type iron core comprising a coil and movable iron piece for leaking magnetic fluxes; such belt is imparted with flexibility by connecting a number of flat sheets, or other flat sheets of high electroconductive material are embedded in each of said flat sheets and simultaneously are connected in series with each other by lead wires. As a consequence, the heat generated in flat sheets of high electroconductive material is gradually transmitted to other flat sheets incorporated therewith, whereby such flat sheets are heated, and the endless belt can be advantageously used as a conveyor and simultaneously as a heating means.

In accordance with a third embodiment of this invention the endless heating conveyor belt is imparted with flexibility by being constructed from a number of flat metallic sheets, such as copper sheet groups, which are closely fitted with high electroconductive metallic sheets, and which are mutually connected electrically. Thus, a flat copper sheet is closely fixed to the rear face of a flat iron sheet, and since such copper sheets are mutually connected in series by connecting metal pieces, the current induced on the endless belt flows with a high current intensity through such flat copper sheet of low electric resistance, resulting advantageously in a high consumption of electric power and a high heat generating value.

In the heating conveyor belt of aforementioned construction, a desired voltage or amperage is imparted to the endless belt by using a plurality of iron cores, and, for economy of material to be used, a plurality of frame-type iron cores around which coils are wound are arranged in parallel according to the fourth embodiment of the present invention, with one metallic endless belt being passed through each coil each of such coils being connected in parallel with lead wires to an A.C. current source, thus an induced voltage per iron core is impressed on the endless belt, thereby increasing the product of the voltage and amperage of the electric current of the endless belt, that is, the power consumption, resulting advantageously in a large heat generation.

In accordance with a fifth embodiment of this invention, a metallic endless belt is passed through the central hole of the coil whereby they intersect perpendicularly, and both are directly and magnetically connected. This process shows a relatively lower electric loss and requires no iron core as compared with a process in which a conveyor belt is further passed through an iron core around which coils are wound, thus the apparatus may be advantageously made with light weight material and consequently low cost.

In the following, the present invention will be described in detail in connection with the accompanying drawings, of which FIG. 1 is an oblique view of a first embodiment of the heating conveyor belt according to the present invention with a part thereof being omitted;

Throughout all the drawings, similar parts are represented by similar symbols.

The present invention is described by way of example in the following, but it is never limited thereby, and of course it is possible to make numerous modifications, within the spirit and scope of this invention as defined later in the patent claim.

Figure 1:
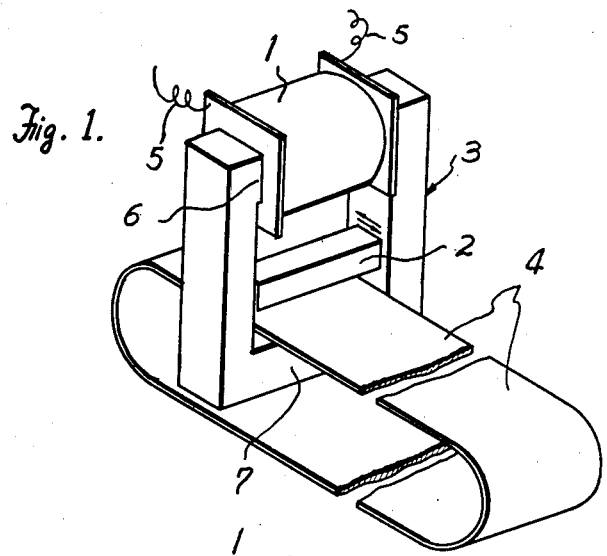

FIG. 1 represents an oblique view of a first embodiment of the heating conveyor belt, which is constructed in its simplest form according to the fundamental principle of this invention. In said drawing, 1 is a coil; 2 is a movable iron piece for leaking magnetic fluxes; 3 is an iron core; 4 is an endless conveyor belt which is composed of electroconductive material; and 5 are lead wires. Said iron core 3 is formed in a frame shape; around the upper frame portion 6 is wound round with a coil 1, and a movable iron piece 2 is disposed in the core 3 for movement in the direction of arrows. An endless conveyor belt 4 passes between the movable iron piece 2 and a lower frame portion 7 of the iron core 3, and the conveyor belt is driven by a well-known driving means which is not illustrated.

The function of the device of said construction will now be described: When A.C. current is passed through the coil 1 by means of the lead wires 5, reciprocating magnetic fluxes are generated in the iron core 3; the endless belt 4, which passes through said iron core 3, acts similarly as a secondary coil wound around the iron core 3 in one turn, resulting in the occurrence of induction voltage in said endless belt causing current to flow through said endless belt, and accordingly heat is generated on said endless belt 4 due to the electric resistance of the endless belt.

In this case, as a part of the magnetic fluxes passing through the movable iron piece 2, if the position of said iron piece is approached or departed to or from the iron core 3 as in the direction of arrows illustrated, the intensity of magnetic fluxes passing through the portion of the endless belt 4 which is wound with said iron core will become low or high, thus varying induced voltage on said endless belt, thereby enabling the control of heat generation.

As obvious from the foregoing description, according to the present embodiment of this invention, said endless belt may be used both for a conveyor belt and simultaneously for a heating means. In particular, the belt may be used extremely advantageously, for instance, for the adhesion of lamellar wooden sheets, under heat or manufacturing baked cakes or the like.

Figure 2:
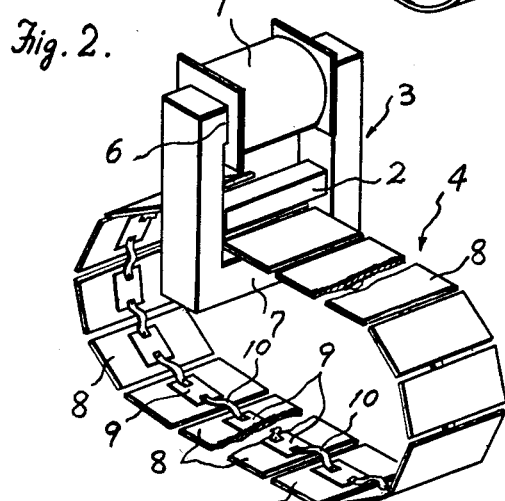
FIG. 2 is also an oblique view showing a second embodiment of this invention, similar as that shown in FIG. 1.
Figure 3:
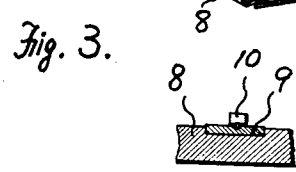
FIG. 3 is an enlarged, partial, longitudinal, sectional view of a detail of FIG. 2.

In the next place, FIG. 2 represents an oblique view of a second embodiment of this invention; and the present embodiment is a device wherein in a heating conveyor belt is imparted with flexibility by composing same from a number of flat sheets 8 connected consecutively; each flat sheet 8 is provided with a high electrical conductive flat sheet 9 embedded in sheet 8 as illustrated in FIG. 3 and also that each of flat sheets are connected in series with connecting leading wires 10.

Similarly as in said first embodiment, when A.C. current is passed through the coil 1, reciprocating magnetic fluxes occur on the iron core 3, the high electroconductive flat sheet 9 and connecting leading wire 10 which are incorporated with the endless belt 4 pass through said iron core 3 to act as a secondary coil wound around the iron core 3 in one turn, consequently an induced voltage occurs there and the current induced passes through the flat sheet 8 and heat is generated on account of the electric resistance of sheet 8.

In this case when the flat sheets 8 are made of electrononconductive material, or a conductor is used, those are further fitted with flat sheets 9 made of high electroconductive material 9 and mutually connected with the connecting leading wires 10, for the reason that, if said high electroconductive sheets are not provided, current will pass through the flat sheets 8 and their connected portions, thus unnecessary high heat will be generated due to the electric resistance or electric arc will sometimes be generated, resulting in high burning loss and other disadvantages to be avoided. In order to control the heat generation, the current passing through the coil 1 is controlled, or the intensity of magnetic fluxes passing through the portion of said endless belt wound around with said coil 1 is controlled by approaching or departing the movable iron piece 2 to or from the iron core for accomplishing the purpose.

FIG. 2 of this invention is, as apparent from the above description, concerned with means for producing resistant heat by the induced current passing through the endless belt wherein the passage of electric current through said endless belt is facilitated and, as a result, sufficient heat generation is attainable, wherein particularly the heat generated on each of the flat sheets 9 is transmitted to flat sheets 8. Since said flat sheets 8 are heated, the endless belt 4 may be used as a conveyor belt and utilized as heating means; for instance, the means according to this embodiment may be conveniently applied for bonding together lamellar wooden sheets under heat and simultaneously for preparing baked cases.

Figure 4:
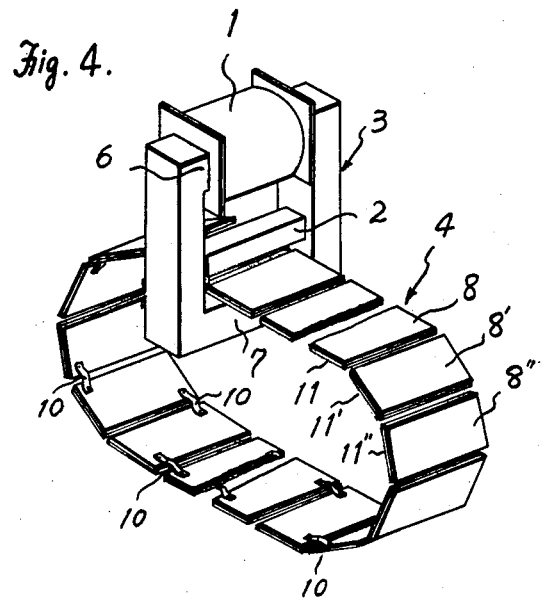
FIG. 4 is an oblique view showing a third embodiment of this invention similar as that shown in FIG. 1.

FIG. 4 illustrates in an oblique view a third embodiment of this invention wherein said endless belt includes numerous groups of flat metallic sheets 8, 8', 8" . . ., to each of which a high electroconductive metallic sheet 11, 11', 11" . . . is closely fixed respectively. These sheets are electrically connected with each other, whereby a heating conveyor belt like that of the first embodiment is provided with an endless belt 4 passing through a frame type iron core 3 which comprises a coil 1 and a movable iron piece 2.

In a heating conveyor belt of the type just referred to, when metal such as iron is used, for purpose of increasing the mechanical strength of the endless belt the electrical resistance will be high, while said endless belt is regarded as a secondary coil having a single turn of coil; accordingly, the induced voltage occurred therein is low; therefore a heavy current does not flow through said endless belt, and as a result, the power consumption becomes low and heat generation low.

From the foregoing description, it is ascertained that according to the present embodiment, in order to eliminate the disadvantages of well-known heating conveyor belt referred to above, each of the flat copper sheets, 11, 11', 11" . . . is closely adhered respectively to each rear face of flat iron sheets 8, 8', 8" . . ., and those are connected with each other by means of connecting metal pieces 10, which comprises connecting leading wires respectively. Therefore, the induced current generated on the endless belt 4 flows at high amperage through said flat copper sheet, and both the power consumption and heat generation become large.

In this case, the heat generated in the said flat copper plate groups is transmitted to said flat iron sheet group, said flat iron sheet group is heated. Thus, material to be heated is loaded on said flat iron sheet group not illustrated, and said material is heated, while said endless belt is being moved.

Figure 5:
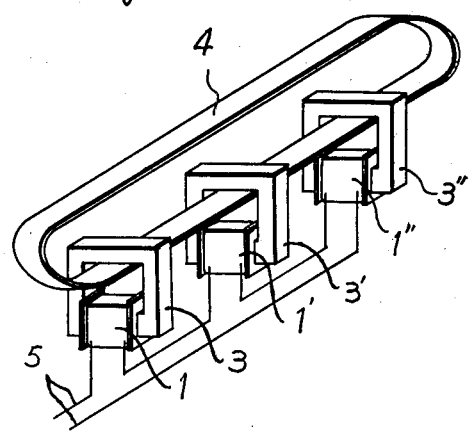
FIG. 5 is an oblique view showing a fourth embodiment of this invention similar as that shown in FIG. 1.

FIG. 5 represents in an oblique view the fourth embodiment of this invention wherein a plurality of frame-type iron cores 3 each provided with a coil 1 of one turn, and wherein a single endless belt is made to pass through each iron core.

Anyone of the metallic endless belt embodiments referred to above may be passed through one frame-type iron core wound round with coils. Then, when A.C. current is passed through the coils, said endless belt will act as a secondary coil of one turn, induced voltage occurs and consequently, heat is generated by the electric current passing through said endless belt. Therefore, it is an appropriate device for heating materials while being transmitted. However, sine the number of turns is unity, the size of the iron core becomes large and the number of turns for coils also become large, and moreover, the voltage to be imput and current are required inconveniently large.

The present embodiment is contemplated to eliminate said inconveniences. Referring to FIG. 5, a plurality of iron cores, 3, 3', 3", . . . each having a respective ciol, 1, 1', 1", . . . are used, the metaillic endless belt 4 being passed through all those iron cores, and said coils, 1, 1', 1", are connected in parallel with each other by leading wires 5, and when A.C. current is passed through said leading wires, induced voltage is thereby generated in said endless belt per each iron core 3, 3', 3" . . . Therefore, when a voltage of 2 volts is assumed to occur per iron core, it is obvious that 6 volts in total will occur if three such iron cores are used. As a result, the product between the current passing through the endless belt 4 and corresponding voltage, that is, the consumption of electric power bocomes large and consequently the generation of heat also large.

Furthermore, for obtaining equivalent induced voltage, the necessary number for iron cores and coils is smaller and voltage impressed on each coil and current is lower in the case of a plurality of iron cores are used, as compared with the case of one large iron core being used. In addition, the former case is more convenient, because the manufacture and operation of the device are easier due to lower voltage and lower current as referred to above. Furthermore, when the supplied voltage is held constant, the induced voltage occurred through the endless belt is high for parallel connection of the coils, 1, 1', 1'', while the current becomes large for series connection of above-mentioned coils. Thus, the present embodiment enables a desired voltage or amperage to be induced in the endless belt in a simple manner using materials that result in an economical advantage.

Figure 6:
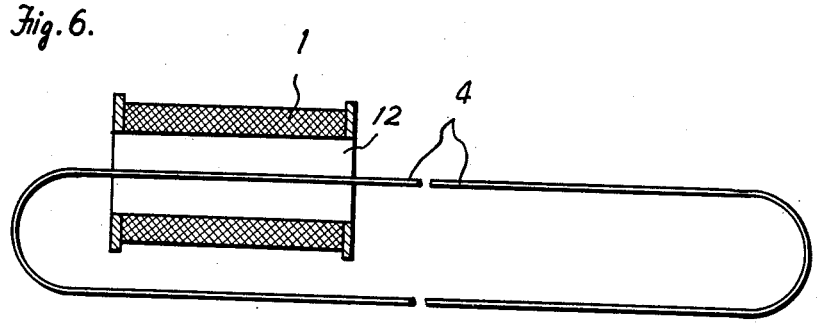
FIG. 6 is a longitudinal sectional view showing a fifth embodiment of this invention, similar as shown in FIG. 1.
Figure 7:
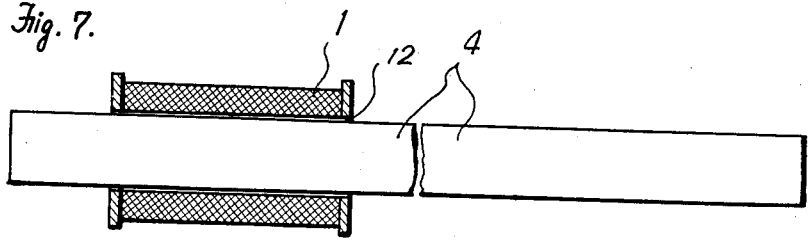
FIG. 7 is a plan view of FIG. 6.

FIGS. 6 and 7 represent the fifth embodiment of this invention respectively in a longitudinal sectional view and in a plan view. The present embodiment enables heat to be generated in a heating conveyor belt made of metal in high efficiency by means of magnetic fluxes and simultaneously economy of materials may be obtained. Therefore, according to this embodiment of this invention, a metallic endless conveyor belt 4 is passed through a central hole 12 of the coil 1 and both are intersected perpendicularly.

The function of the device having the construction referred to above will now be described as follows: The metallic endless conveyor belt 4 is passed through the central hole 12 of the coil 1, reciprocating magnetic fluxes are generated around said coil and said magnetic fluxes penetrate said endless belt.

Thus, according to the present embodiment, as referred to above, a metallic endless belt is passed through the central hole 12 of coil 1 and as both are directly connected with each other magnetically, electric loss is relatively low as compared with the method in which a further conveyor belt is passed through said iron core wound with said coil and, as no iron core is needed, the device is easy to make due to light weight and at low cost.

What I claim is:

In conveyor apparatus, the combination comprising a plurality of spaced electrical heating means each including a frame-type iron core and an electric coil wound on said core to define a primary winding, an endless conveyor belt adapted for movement through each iron core, said endless conveyor belt including electroconductive material and defining a secondary winding for each iron core whereby said endless conveyor belt is heated in response to alternating current impressed on each primary winding, said endless conveyor belt including a plurality of flat sheets each having a top surface member defining a supporting surface and an undersurface member having a higher electroconductive property than said top surface member, means electrically connecting said flat sheets to each other in series arrangement, and a movable iron piece for each iron core to adjust flux leakage and thereby control heating temperatures in said endless conveyor belt.

References Cited by the Examiner
UNITED STATES PATENTS

| | | | |
|---|---|---|---|
| 2,114,833 | 4/38 | Fincke | 219—10.69 X |
| 2,301,589 | 11/42 | Shepard | 219—10.69 X |
| 2,650,290 | 8/53 | Newhouse | 219—10.69 |
| 2,674,050 | 4/54 | Pound | 219—10.69 |
| 2,839,651 | 6/58 | Erickson | 219—10.69 |
| 2,945,935 | 7/60 | Messner et al. | 219—10.69 X |

RICHARD M. WOOD, *Primary Examiner.*